Patented Sept. 10, 1946

2,407,584

UNITED STATES PATENT OFFICE 2,407,584

ALKYLATION PROCESS

William A. Stover, Woodbury, N. J., assignor to Socony-Vacuum Oil Company, Incorporated, a corporation of New York No Drawing. Application February 24, 1944, Serial No. 523,727

15 Claims. (Cl. 260—683.4)

This invention relates generally to the alkylation of paraffinic hydrocarbons with olefinic hydrocarbons, and is more particularly concerned with the production of high-octane motor fuel by the catalytic alkylation of paraffinic hydrocarbons with olefinic hydrocarbons.

It is well known in the art to polymerize olefinic hydrocarbon gases to produce motor fuels having constituents of an unsaturated character. Various commercial processes have been proposed for ultimately effecting the desired polymerization of the olefinic hydrocarbons. These processes have been predicated upon the dictates of the chemical nature of the stocks available as well as engineering considerations such as initial and operation costs; their essential feature being that in the course of treating the materials, the olefinic hydrocarbons produced in the earlier stages of the process, are eventually polymerized to gasoline. Accordingly, hydrocarbon gases may be passed along with cracking stock or naphtha through a cracking still to crack and polymerize such gases to gasoline simultaneously with the cracking or reforming, or paraffinic hydrocarbon gases may be separately cracked to olefinic hydrocarbon gases and these gases are subsequently passed with naphtha through a polymerizing and reforming still. In some instances, the processes involve the use of catalysts for facilitating the cracking and/or polymerization operations.

It is also well known in the art, to combine paraffinic hydrocarbons directly with olefinic hydrocarbons by processes broadly called alkylation processes, to produce motor fuels having constituents of saturated character. In alkylation processes, a charge comprising a mixture of a paraffinic hydrocarbon, called the paraffinic reactant, and an olefinic hydrocarbon, called the olefinic reactant, is subjected to high temperature and pressure to produce a saturated alkylate product. Since these temperature, pressure, etc., conditions, or briefly, alkylating conditions, also cause polymerization of the olefinic reactant, it is necessary to maintain a relatively low concentration of the olefinic reactant in the charge. The only limit to the pressure used appears to be the feasibility of maintaining high pressures. On the other hand, the temperature used is limited by degradation of the hydrocarbon reactants in the charge to low molecular weight hydrocarbons, and the occurrence of side reactions, including polymerization of the olefinic reactant, under high temperature conditions, that substantially reduce the purity of the product obtained.

Alkylation may be conducted at high temperatures and pressures, on the order of over 900° F. and over 4000 pounds per square inch gauge, respectively; or may be conducted in the presence of alkylation catalysts, at lower temperatures and pressures, thereby assuring a high yield of desired alkylate by avoiding extensive degradation of the reactants, the occurrence of side and secondary reactions, and appreciable polymerization of the olefinic reactant. The two methods are known as thermal alkylation and as catalytic alkylation, respectively.

Several methods are known for the catalytic alkylation of isoparaffinic hydrocarbons with olefinic hydrocarbons. For instance, it is known to alkylate isoparaffinic hydrocarbons with olefinic hydrocarbons in the presence of sulfuric acid, phosphoric acid, metal phosphates, metal halides, activated clays and the like, as catalysts. In these catalytic alkylation processes, the hydrocarbon reactants form with the alkylation catalysts, a heterogeneous system during the alkylation operations. Since under alkylation conditions, the catalytic activity of the alkylation catalysts appears to be predicated upon contact between the catalysts and the gaseous hydrocarbon reactants at the interfaces therebetween, in these processes, the catalysts are used in amounts varying between about 10% and 200% by weight, on the charge, depending on the catalyst used. Due to these comparatively high amounts, where possible, recovery and regeneration of the catalysts have been proposed. This, of course, involves high initial and operation costs. Further, it is also known that certain substances called promoters, promote the catalytic action of these alkylation catalysts. Accordingly, several processes have been proposed wherein small amounts of these promoters, on the order of about 1% to 3% by weight on the charge, are added to the catalysts to promote their alkylation catalytic activity.

A copending application, Serial Number 502,018, filed September 11, 1943, is directed to the process of alkylating paraffinic or isoparaffinic hydrocarbons with olefinic hydrocarbons, which comprises contacting a paraffinic or isoparaffinic hydrocarbon and an olefinic hydrocarbon in a reaction zone under alkylating conditions, with small amounts of what has been termed therein, a homogeneous gaseous phase alkylation catalyst which consists essentially of materials that form with the hydrocarbon reactants, a single, homogeneous gaseous phase under the alkylating conditions of the reaction zone. The alkylating conditions of the process of this copending application, comprise a broad temperature range of about 590° F. to about 850° F., preferably, about 650° F. to about 825° F., and pressures of at least 500 pounds per square inch gauge, preferably, at least 1500 pounds per square inch gauge.

Another copending application, Serial Number 502,813, filed September 17, 1943, is directed to the process of alkylating isobutane with propylene, which comprises contacting isobutane with propylene in a reaction zone under closely controlled alkylating conditions, with promoter or small amounts of the homogeneous gaseous phase catalysts broadly disclosed in the copending application referred to hereinabove, the closely controlled alkylating conditions including a temperature range of about 750° F. to about 850° F., preferably, about 775° F. to about 825° F., and pressures of at least 2500 pounds per square inch gauge. In the alkylation of isobutane with propylene in the presence of homogeneous gaseous phase alkylation catalysts, it was found that the alkylate obtained included constituents that are entirely different from the constituents of the hydrocarbon alkylate obtained in the alkylation of isobutane with propylene in the presence of known heterogeneous alkylation catalysts, i. e., $AlCl_3$, $H_2SO_4$, and the like. Thus, when heterogeneous alkylation catalysts are used, 2,3-dimethylpentane and 2,4-dimethylpentane are important constituents of the hydrocarbon alkylate obtained. On the other hand, triptane or 2,2,3-trimethylbutane, 2,2-dimethylpentane, and 2-methylhexane are the predominant constituents of the hydrocarbon alkylate, when gaseous phase homogeneous alkylation catalysts are employed. In this copending application, the formation of these three compounds was postulated as follows:

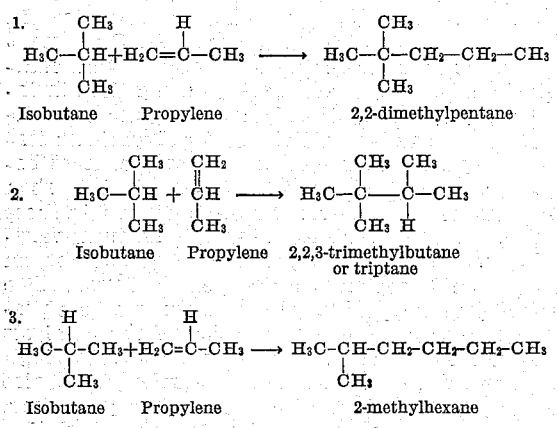

From a motor fuel standpoint, the 2,2-dimethylpentane produced by the first reaction, has an octane number of about 80 CFR motor method; the triptane produced by the second reaction has an octane number of well over 100, and the 2-methylhexane obtained in the third reaction, has an octane number of about 45. In view of the foregoing, in the manufacture of high-octane motor fuel by the alkylation of isobutane with propylene, alkylation conditions that favor the production of triptane obviously are preferable. Further, since neohexane which may be produced by the alkylation of isobutane with ethylene, has an octane number of 93.4, and since 2,3-dimethylpentane and 2,4-dimethylpentane which are the predominant constituents of the alkylate obtained in the alkylation of isobutane with propylene in the presence of heterogeneous alkylation catalysts, have octane numbers of 89 and 82, respectively, the importance of the alkylation of isobutane with propylene in the presence of homogeneous gaseous phase catalysts under alkylation conditions that favor the production of triptane, is manifest. It was also found that in actual practice, it was impossible to obtain triptane exclusively, appreciable amounts of 2,2-dimethylpentane and 2-methylhexane being always formed.

The specific classes of homogeneous gaseous phase alkylation catalysts claimed in the above-noted copending applications, are organic halides, and, more particularly, organic chlorides and organic bromides.

I have found that carbon dioxide is a suitable homogeneous gaseous phase alkylation catalyst, and that isoparaffinic or paraffinic hydrocarbons may be efficiently alkylated with olefinic hydrocarbons to produce high yields of high-octane gasoline, by using relatively small amounts of carbon dioxide.

I have also found that carbon dioxide is a suitable homogeneous gaseous phase catalyst in the catalytic alkylation of isobutane with propylene under the controlled alkylating conditions described in copending application, Serial Number 502,813, filed September 17, 1943, referred to hereinbefore.

It is an object of the present invention to provide an efficient process for catalytically alkylating isoparaffinic or paraffinic hydrocarbons with olefinic hydrocarbons. Another object is to provide an efficient process for catalytically alkylating either normal paraffinic hydrocarbons or isoparaffinic hydrocarbons with olefinic hydrocarbons to produce high yields of high-octane motor fuel. A more specific object is to provide a process for catalytically alkylating isobutane with propylene to produce high yields of high-octane motor fuel. A very important object is to afford a process capable of carrying out the above objects by using relatively small amounts of carbon dioxide as alkylation catalyst. Other objects and advantages of the present invention will become apparent to those skilled in the art from the following description.

Broadly stated, my invention provides a process for alkylating paraffinic or isoparaffinic hydrocarbons, particularly isobutane, with olefinic hydrocarbons, particularly propylene, which comprises contacting the paraffinic and olefinic hydrocarbons in gaseous phase and in a reaction zone under alkylating conditions, with an alkylation catalyst consisting essentially of carbon dioxide.

An important feature of the process of the present invention is the fact that, contrary to the known catalytic alkylation processes of the prior art which are only capable of alkylating isoparaffinic hydrocarbons, my process is capable of alkylating either normal paraffinic or isoparaffinic hydrocarbons with substantially equal ease.

Another important feature of the process of the present invention is the relatively low temperature that may be used. As a result, degradation of the hydrocarbon reactants in the charge to low molecular weight hydrocarbons and the pronounced occurrence of side reactions including polymerization of the olefinic reactants, are substantially completely avoided. Consequently, in my process, I obtain high yields of a high grade product that is almost entirely paraffinic in nature and is substantially free from impurities.

A very important feature of the present invention is the fact that, contrary to known catalytic processes of the prior art in which the hydrocarbon reactants being processed form with the alkylation catalysts, a heterogeneous system during the alkylation operation, the alkylation process of my invention employs an alkylation catalyst that forms, with the hydrocarbon reactants being processed, a single, homogeneous gaseous phase under the alkylating conditions of the reaction zone. Accordingly, as a result of the catalyst being in the same phase or state as the hydrocarbon reactants being processed, fouling of the catalyst is substantially eliminated and agitation and/or mixing problems are non-extant. Further, since the catalytic activity of alkylation catalysts appears to be predicated somewhat upon contact between the catalysts and the gaseous hydrocarbon reactants at the interfaces therebetween, it follows that the catalytic efficiency of a given catalyst increases with the increase in area of interfacial contact, other variables remaining constant. Hence, since the catalyst of my process inherently furnishes the greatest possible "interfacial contact" between the catalyst and the hydrocarbon reactants under the alkylating conditions of the reaction zone, efficient catalytic activity with a concomitant high yield of high grade alkylate is achieved using relatively small amounts of carbon dioxide.

In view of the foregoing, an operation feature of the process of the present invention that is of considerable practical importance, is that relatively small amounts of carbon dioxide are used as alkylation catalyst. These amounts and the cost are so small that the catalyst may be discarded feasibly, thereby obviating recovery and regeneration problems and eliminating high initial and operation costs.

A most important feature of the present invention is that high yields of high-octane motor fuel are obtained by alkylating isobutane with propylene in the presence of carbon dioxide.

The amount of carbon dioxide used in my process varies between about 3% and about 20%, and preferably, between about 6% and about 9%, with respect to the volume of the total charge of hydrocarbon reactants. It must be noted, however, that larger amounts of carbon dioxide may be employed if desired, although no additional advantages result therefrom.

The paraffinic and olefinic hydrocarbons to be used in my process may be derived from any suitable source, as is well known in the art, and may be used either in the pure state or in admixture with other constituents not undesirable. The paraffinic and olefinic hydrocarbons usually employed in the preferred operation of manufacturing motor fuels, will be the normally gaseous paraffinic hydrocarbons, except methane and ethane, and the normally gaseous olefinic hydrocarbons, as is well understood in the art. Here again my process has a distinct advantage over many of the prior art processes in that the olefin ethylene may be used for alkylating the paraffinic hydrocarbons. It is well known that ethylene cannot be used in many catalytic processes, including the sulfuric acid process, whereby the supply of available olefinic hydrocarbons is restricted. Therefore, an important aspect of the present invention is the fact that butane, for instance, may be alkylated with ethylene.

A conventional and prefered source of paraffinic and olefinic hydrocarbons is the fixed gases obtained around petroleum refineries. These fixed gases may furnish substantially all the desired paraffinic and olefinic hydrocarbons, or it may be necessary or desirable to obtain additional supplies, as is well understood. Additional olefinic hydrocarbons, if required, may be formed from a portion of the paraffinic hydrocarbons. On the other hand, additional paraffinic hydrocarbons may be admixed to increase the concentration of paraffinic hydrocarbons to a desired magnitude.

In carrying out my process, I use temperatures varying between about 590° F. and about 850° F., preferably temperatures varying between about 650° F. and about 825° F. In the alkylation of isobutane with propylene, however, I have found, as disclosed in the copending application, Serial No. 502,813, filed September 17, 1943, that the best yields of desired alkylate are obtained when the alkylation is conducted at temperatures falling within about 750° F. to about 850° F., and preferably, about 775° F. to about 825° F. The alkylate produced under these conditions contains no more than 5% of olefinic hydrocarbons and no aromatics so that the predominance of alkylation obtained thereby is a distinct feature of my process. Under appreciably higher temperature conditions, side reactions occur that substantially reduce the purity of the product obtained. In the alkylation of isobutane with propylene in accordance with the process of the present invention, it must be noted that even within the preferred temperature range, side reactions occur that account for substantial portions of the total alkylate.

The pressure to be used in my process may vary from about 500 pounds per square inch to about 6000 pounds per square inch or more, and preferably from about 2500 pounds per square inch to about 6000 pounds per square inch for the alkylation of isobutane with propylene, the most suitable pressure being more or less dependent upon the particular temperature involved. In general, the higher the pressure, the higher the yield of alkylate. Accordingly, the criterion for establishing an upper limit to the pressure range used is primarily the feasibility of maintaining such pressure.

In my process it is desirable, as in known isoparaffin-olefin alkylation processes, to keep the concentration of the olefinic reactant relatively low during the alkylation reaction, in order to eliminate as much olefin polymerization as possible. Accordingly, it is advisable to maintain the olefin concentration in the charge below about 25% by volume, and preferably between about 7% and about 12% by volume.

Traces of water apparently have no serious ill effects on the course of the reaction in the process of my invention, and there is evidence to support the conclusion that small amounts of water may be beneficial.

The alkylate product that I obtain distills over a fairly large boiling range, but a greater part of the alkylate, usually from about 85% to about 90%, distills in the boiling range of aviation gasolines. The iodine number of the aviation distillate is low, on the order of about 5 to 10. As mentioned hereinabove, the alkylate product consists predominantly of branched paraffinic hydrocarbons.

Numerous experimental data could be adduced to indicate the results obtainable in accordance with the process of the present invention, but the folowing examples are sufficiently characteristic:

*Example 1*

Isobutane was alkylated with propylene in a two-liter high pressure bomb at temperatures varying between 750° F. and 785° F., and under pressures varying between 4300 pounds per square inch and 5100 pounds per square inch, for 30 minutes, thermally and catalytically, in the presence of propylene bromide and carbon dioxide. The results were as follows:

| Catalyst | Yield of alkylate boiling at 75° C.–85° C., per cent by weight | Per cent of triptane in alkylate boiling at 75° C.–85° C. |
|---|---|---|
| None | 14.7 | 9±1 |
| Propylene bromide | 35.1 | 6±1 |
| Carbon dioxide | 37.7 | 5±1 |

The results show that the catalytic processes form greater yields of alkylate boiling at 75° C.–85° C. and greater overall yields of triptane.

*Example 2*

Isobutane was alkylated with propylene in a two-liter high pressure bomb at temperatures varying between 750° F. and 800° F. and under pressures varying between 3500 pounds per square inch and 4350 pounds per square inch, using varying amounts of carbon dioxide. The results of the runs were as follows:

| Amount of catalyst, per cent by volume of charge | Yield of alkylate boiling at 75° C.–85° C., per cent by weight | Per cent triptane in alkylate boiling at 75° C.–85° C. |
|---|---|---|
| 3.8 | 30.0 | 5±1 |
| 7.4 | 37.7 | 5±1 |
| 11.9 | 31.0 | 6±1 |
| 19.0 | 30.0 | 6±1 |

The results show that the catalytic effect of carbon dioxide reaches a maximum at concentrations of about 7% to 8%.

*Example 3*

Isobutane was alkylated with ethylene in the presence of 7.4% by volume of carbon dioxide, in a two-liter high pressure bomb at temperatures varying between 750° F. and 784° F. and under pressures varying between 3600 pounds per square inch and 3700 pounds per square inch, for 30 minutes. An alkylate containing the following hexanes was obtained:

```
                                                    Per cent
                                                   by weight
(1) Neohexane fraction containing:
    (a) 2,2-dimethylbutane (neohexane)_____ 95
    (b) 2,3-dimethylbutane (diisopropyl)_____  2
    (c) Other hexanes_____ balance
        and boiling at 40° C.–55° C_____         30.1
(2) Diisopropyl fraction containing:
    (a) 2,2-dimethylbutane (neohexane)_____ 10
    (b) 2,3-dimethylbutane (diisopropyl)_____ 15
    (c) Other hexanes_____ balance
        and boiling at 55° C.–65° C_____         15.2
                                                         ----
        Total hexanes in alkylate_____         45.3
```

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

I claim:

1. In the process of alkylating a paraffinic hydrocarbon with an olefinic hydrocarbon, which includes reacting a paraffinic hydrocarbon with an olefinic hydrocarbon, in a reaction zone under alkylating conditions, in the presence of catalytic material, and controlling the concentration of the olefinic hydrocarbon so that alkylation is the principal reaction; the improvement which comprises reacting said paraffinic hydrocarbon with said olefinic hydrocarbon, in a reaction zone under alkylating conditions, in the presence of carbon dioxide.

2. The process of manufacturing high-octane motor fuel, which comprises reacting a light isoparaffinic hydrocarbon with a light olefinic hydrocarbon, in a reaction zone under alkylating conditions, in the presence of carbon dioxide, and controlling the concentration of the light olefinic hydrocarbon so that alkylation is the principal reaction.

3. The process of manufacturing triptane, which comprises reacting isobutane with propylene, in a reaction zone under alkylating conditions including temperatures varying between about 775° F. and about 825° F. and pressures of at least 2500 pounds per square inch, in the presence of carbon dioxide, and controlling the concentration of propylene so that alkylation is the principal reaction.

4. The process of manufacturing neohexane, which comprises reacting isobutane with ethylene, in a reaction zone under alkylating conditions including temperatures varying between about 650° F. and about 825° F. and pressures of at least 1500 pounds per square inch, in the presence of carbon dioxide, and controlling the concentration of the ethylene so that alkylation is the principal reaction.

5. In the process of alkylating an isoparaffinic hydrocarbon with an olefinic hydrocarbon, which includes reacting an isoparaffinic hydrocarbon with an olefinic hydrocarbon, in a reaction zone under alkylating conditions, in the presence of catalytic material, and controlling the concentration of the olefinic hydrocarbon so that alkylation is the principal reaction; the improvement which comprises reacting said isoparaffinic hydrocarbon with said olefinic hydrocarbon, in a reaction zone under alkylating conditions including temperatures varying between about 590° F. and about 850° F. and pressures of at least 500 pounds per square inch, in the presence of carbon dioxide.

6. The process of manufacturing high-octane motor fuel, which comprises reacting a normally gaseous isoparaffinic hydrocarbon with a normally gaseous olefinic hydrocarbon, in a reaction zone under alkylating conditions including temperatures varying between about 650° F. and about 825° F. and pressures of at least 1500 pounds per square inch, in the presence of carbon dioxide, and controlling the concentration of the normally gaseous olefinic hydrocarbon so that alkylation is the principal reaction.

7. In the process of manufacturing high-octane motor fuel by alkylating a normally gaseous isoparaffinic hydrocarbon with a normally gaseous olefinic hydrocarbon, which includes reacting said normally gaseous isoparaffinic hydrocarbon with said normally gaseous olefinic hydrocarbon, in a reaction zone under alkylating conditions, in the presence of catalytic material, and controlling the concentration of the normally gaseous olefinic hydrocarbon so that alkylation is the principal reaction; the improvement which comprises reacting said normally gaseous isoparaffinic hydrocarbon with said normally gaseous olefinic hydrocarbon, in a reaction zone under alkylating conditions including temperatures varying between about 750° F. and about 850° F. and pressures of at least 2500 pounds per square inch, in the presence of carbon dioxide.

8. In the process of alkylating a paraffinic hydrocarbon with an olefinic hydrocarbon, which includes reacting a paraffinic hydrocarbon with an olefinic hydrocarbon, in a reaction zone under alkylating conditions, in the presence of catalytic material, and controlling the concentration of the olefinic hydrocarbon so that alkylation is the principal reaction; the improvement which comprises reacting said paraffinic hydrocarbon with said olefinic hydrocarbon, in a reaction zone under alkylating conditions, in the presence of an alkylation catalyst consisting essentially of carbon dioxide, in amounts varying between about 3% and about 20% with respect to the total volume of the charge.

9. The process of manufacturing high-octane motor fuel, which comprises reacting a light isoparaffinic hydrocarbon with a light olefinic hydrocarbon, in a reaction zone under alkylating conditions including temperatures varying between about 590° F. and about 850° F. and pressures of at least 500 pounds per square inch, in the presence of an alkylation catalyst consisting essentially of carbon dioxide in amounts varying between about 3% and about 20% with respect to the total volume of the charge, and controlling the concentration of the light olefinic hydrocarbon so that alkylation is the principal reaction.

10. In the process of manufacturing high-octane motor fuel by alkylating isobutane with propylene, which includes reacting said isobutane and said propylene, in a reaction zone under alkylating conditions, in the presence of catalytic material, and controlling the concentration of the propylene so that alkylation is the principal reaction; the improvement which comprises reacting said isobutane with said propylene, in a reaction zone under alkylating conditions including temperatures varying between about 750° F. and about 850° F. and pressures of at least 2500 pounds per square inch, in the presence of an alkylation catalyst consisting essentially of carbon dioxide, in amounts varying between about 3% and about 20% with respect to the total volume of the charge.

11. The process of manufacturing triptane, which comprises reacting isobutane with propylene, in a reaction zone under alkylating conditions including temperatures varying between about 775° F. and about 825° F. and pressures of at least 2500 pounds per square inch, in the presence of an alkylation catalyst consisting essentially of carbon dioxide in amounts varying between about 6% and about 9% with respect to the total volume of the charge, and controlling the concentration of the propylene so that alkylation is the principal reaction.

12. The process of manufacturing neohexane, which comprises reacting isobutane with ethylene, in a reaction zone under alkylating conditions including temperatures varying between about 650° F. and about 825° F. and pressures of at least 1500 pounds per square inch, in the presence of an alkylation catalyst consisting essentially of carbon dioxide in amounts varying between about 6% and about 9% with respect to the total volume of the charge, and controlling the concentration of the ethylene so that alkylation is the principal reaction.

13. The process of alkylating a paraffinic hydrocarbon with an olefinic hydrocarbon, which comprises contacting said paraffinic hydrocarbon and said olefinic hydrocarbon in gaseous phase and in a reaction zone under alkylating conditions, with an alkylation catalyst consisting essentially of carbon dioxide, and controlling the concentration of the olefinic hydrocarbon so that alkylation is the principal reaction.

14. The process of manufacturing high-octane motor fuel, which comprises contacting a light isoparaffinic hydrocarbon and a light olefinic hydrocarbon in gaseous phase and in a reaction zone under alkylating conditions, with an alkylation catalyst consisting essentially or carbon dioxide, and controlling the concentration of the light olefinic hydrocarbon so that alkylation is the principal reaction.

15. The process of manufacturing triptane, which comprises contacting isobutane and propylene in gaseous phase and in a reaction zone under alkylating conditions, with an alkylation catalyst consisting essentially of carbon dioxide, and controlling the concentration of the propylene so that alkylation is the principal reaction.

WILLIAM A. STOVER.